(12) United States Patent
Verma et al.

(10) Patent No.: US 9,197,376 B2
(45) Date of Patent: Nov. 24, 2015

(54) TRANSMISSION TIME INTERVAL (TTI) BUNDLING OPERATION WITHIN COMMUNICATION SYSTEMS

(71) Applicant: BROADCOM CORPORATION, Irvine, CA (US)

(72) Inventors: Sindhu Verma, Bangalore (IN); Shubhodeep Adhikari, Bangalore (IN); Soumen Chakraborty, Bangalore (IN)

(73) Assignee: BROADCOM CORPORATION, Irvine, CA (US)

( * ) Notice: Subject to any disclaimer, the term of this patent is extended or adjusted under 35 U.S.C. 154(b) by 211 days.

(21) Appl. No.: 13/934,621

(22) Filed: Jul. 3, 2013

(65) Prior Publication Data

US 2014/0040694 A1 Feb. 6, 2014

Related U.S. Application Data

(60) Provisional application No. 61/679,483, filed on Aug. 3, 2012, provisional application No. 61/840,343, filed on Jun. 27, 2013.

(51) Int. Cl.
*H04L 1/18* (2006.01)

(52) U.S. Cl.
CPC ............ *H04L 1/1812* (2013.01); *H04L 1/1819* (2013.01); *H04L 1/1887* (2013.01)

(58) Field of Classification Search
CPC .... H04L 1/1812; H04L 1/1819; H04L 1/1887
See application file for complete search history.

(56) References Cited

U.S. PATENT DOCUMENTS

| | | | | |
|---|---|---|---|---|
| 8,411,626 | B2 * | 4/2013 | Kuo | 370/329 |
| 2010/0098010 | A1 * | 4/2010 | Kuo | 370/329 |
| 2010/0169732 | A1 * | 7/2010 | Wu | 714/748 |
| 2010/0278064 | A1 * | 11/2010 | Jeong | 370/252 |
| 2013/0242889 | A1 * | 9/2013 | Khoryaev et al. | 370/329 |

* cited by examiner

*Primary Examiner* — Sam Rizk
(74) *Attorney, Agent, or Firm* — Garlick & Markison; Randy W. Lacasse

(57) ABSTRACT

TTI bundling is included for Msg3 transmissions in LTE communications. A reserved group of preambles or reserved set of random access preamble transmission opportunities are used to indicate user equipment (UE) need of uplink (UL) transmission of a TTI-bundled Msg3. The UE transmits the same redundancy version for transmissions within a TTI bundle as the eNB expects even if any of the transmissions are dropped due to collisions with an Msg3 transmission. In addition, co-existence of TTI bundling and UL semi-persistent scheduling (SPS) for TDD DL/UL configurations is provided using SPS intervals which are multiples of various fixed time periods.

17 Claims, 10 Drawing Sheets

| Subframe | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Uplink |  |  | U | U | U |  |  | U | U |  |  |  | U | U | U |  |  | U | U |  |
| HARQ process |  |  | 0 | 0 | 0 |  |  | 1 | 1 |  |  |  | 1 | 1 | 1 |  |  | 0 | 0 |  |
| UL SPS occasions |  |  | ■ |  |  |  |  |  |  |  |  |  | ■ |  |  |  |  |  |  |  |

FIG. 10

| Subframe | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Uplink |  |  | U | U | U |  |  | U | U |  |  |  | U | U | U |  |  | U | U |  |
| HARQ process |  |  | 0 | 1 | 1 |  |  | 2 | 2 |  |  |  | 0 | 0 | 1 |  |  | 2 | 2 |  |
| UL SPS occasions |  |  | ■ |  |  |  |  |  |  |  |  |  | ■ |  |  |  |  |  |  |  |

FIG. 11

| Subframe | 0 | 1 | 2 | 3 | 4 | 5 | 6 | 7 | 8 | 9 | 0 | 1 | 2 | 3 | 4 | 5 | 6 | 7 | 8 | 9 |
|---|---|---|---|---|---|---|---|---|---|---|---|---|---|---|---|---|---|---|---|---|
| Uplink |  |  | U | U | U |  |  | U | U |  |  |  | U | U | U |  |  | U | U |  |
| HARQ process |  |  | – | 0 | 0 |  |  | 1 | 2 |  |  |  | – | 1 | 1 |  |  | 2 | – |  |
| UL SPS occasions |  |  | ■ |  |  |  |  |  |  |  |  |  |  | ■ |  |  |  |  |  |  |

FIG. 12

TRANSMISSION TIME INTERVAL (TTI) BUNDLING OPERATION WITHIN COMMUNICATION SYSTEMS

CROSS REFERENCE TO RELATED PATENTS/PATENT APPLICATIONS

The present U.S. Utility Patent Application claims priority pursuant to 35 U.S.C. §119(e) to the following U.S. Provisional Patent Applications which are hereby incorporated herein by reference in their entirety and made part of the present U.S. Utility Patent Application for all purposes:

1. U.S. Provisional Application Ser. No. 61/679,483, entitled "Transmission time interval (TTI) bundling operation within communication systems," filed Aug. 3, 2012, pending.

2. U.S. Provisional Application Ser. No. 61/840,343, entitled "Transmission time interval (TTI) bundling operation within communication systems," filed Jun. 27, 2013, pending.

BACKGROUND

1. Technical Field

The present disclosure described herein relates generally to wireless communications and more particularly to error correction in wireless communication systems.

2. Description of Related Art

Communication systems are known to support wireless and wire line communications between wireless and/or wire line communication devices. The communication systems range from national and/or international mobile/handheld systems to the point-to-point gaming, in-home wireless networks, audio, video wireless devices. Communication systems typically operate in accordance with one or more communication standards such as long-term evolution (LTE).

User equipment (UE), such as a mobile phone operating within a communication system, will often experience reduced transmission quality at the edge of a communications cell, especially in poor radio conditions (e.g., high interference, low transmission power, etc.). As the UE transmits to a cell node, such as an E-UTRAN Node B (eNB), which may include a base transceiver station (BTS-in GSM networks), error correction techniques are used to improve a likelihood of success. One known error correction technique is a hybrid automatic repeat request (HARQ), which includes various methods of repeating the transmission until the receiving node can decode the transmission. HARQ is a combination of high-rate forward error-correcting coding and ARQ (Auto Repeat Request) error-control. Receivers detecting a corrupted message will request a new message from the sender. In HARQ, the original data is encoded with a forward error correction (FEC) code, and the parity bits are either immediately sent along with the message or only transmitted upon request when a receiver detects an erroneous message.

One variation of HARQ, used in LTE, is incremental redundancy HARQ. When the cell node detects erroneous data, it holds it for use with future repeated transmissions. The UE will transmit the same data again with a different set of coded bits. The previously received erroneous data will be combined at the node with newly received data to improve the chances of successfully decoding the data. This will repeat until the receiver is able to decode the data.

BRIEF DESCRIPTION OF THE DRAWING(S)

FIG. 1 illustrates various embodiments of communication systems, including communication devices 110 and 120 and communication channel 199, in accordance with the present disclosure;

FIG. 10 illustrates a subframe embodiment showing transmissions with TTI bundling and semi-persistent scheduling (SPS) in accordance with the present disclosure;

FIG. 11 illustrates another subframe embodiment showing transmissions with TTI bundling and semi-persistent scheduling (SPS) in accordance with the present disclosure; and FIG. 12 illustrates yet another subframe embodiment showing transmissions with TTI bundling and semi-persistent scheduling (SPS) in accordance with the present disclosure.

DETAILED DESCRIPTION

Figure 1:
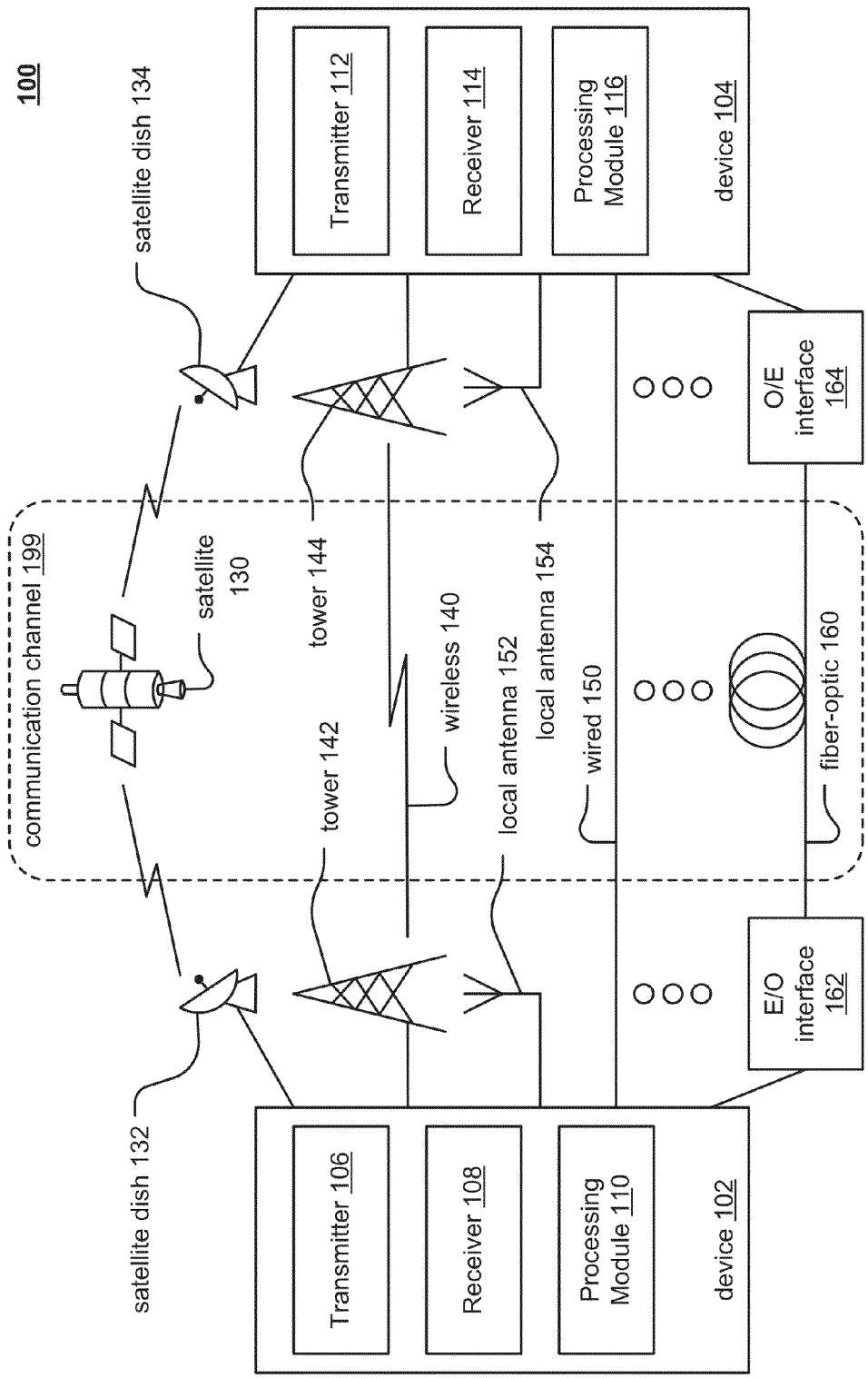

FIG. 1 illustrates various embodiments of communication systems, including communication devices 110 and 120 and communication channel 199, in accordance with the present disclosure. Referring to FIG. 1, this embodiment of a communication system 100 is a communication channel 199 that communicatively couples a communication device 102 situated at one end of the communication channel 199 to another communication device 104 at the other end of the communication channel 199. Communication device 102 includes transmitter 106, receiver 108 (106 and 108 collectively known as a transceiver) and processing module 110. Transmitter 106 includes an encoder (not shown) and receiver 108 includes a decoder (not shown). Communication device 104 includes transmitter 112, receiver 114 (112 and 114 collectively known as a transceiver) and processing module 116. Transmitter 112 includes an encoder (not shown) and receiver 114 includes a decoder (not shown).

There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

It is noted that such communication devices 102 and/or 104 may be stationary or mobile without departing from the scope and spirit of the technology described herein. For example, either one or both of the communication devices 102 and 104 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 102 and/or 104.

To reduce transmission errors that may undesirably be incurred within a communication system, error correction and channel coding schemes are often employed. Generally, these error correction coding schemes involve the use of the previously described encoder at the transmitter end of the communication channel 199 and decoder at the receiver end of the communication channel 199.

Within transmitters 106 and 112 and receivers 108 and 114, any desired integration of various components, blocks, functional blocks, circuitries, etc. therein may be implemented. For example, this diagram shows processing modules 110 and 116. Such processing modules may be respective integrated circuits. Of course, other boundaries and groupings may alternatively be performed without departing from the scope and spirit of the technology described herein. For example, all components within the transmitters 106 and 112 may be included within a first processing module or integrated circuit, and all components within the receiver 108 and 114 may be included within a second processing module or integrated circuit. Alternatively, any other combination of components within each of the transmitters and receivers may be made in other embodiments.

Figure 2:
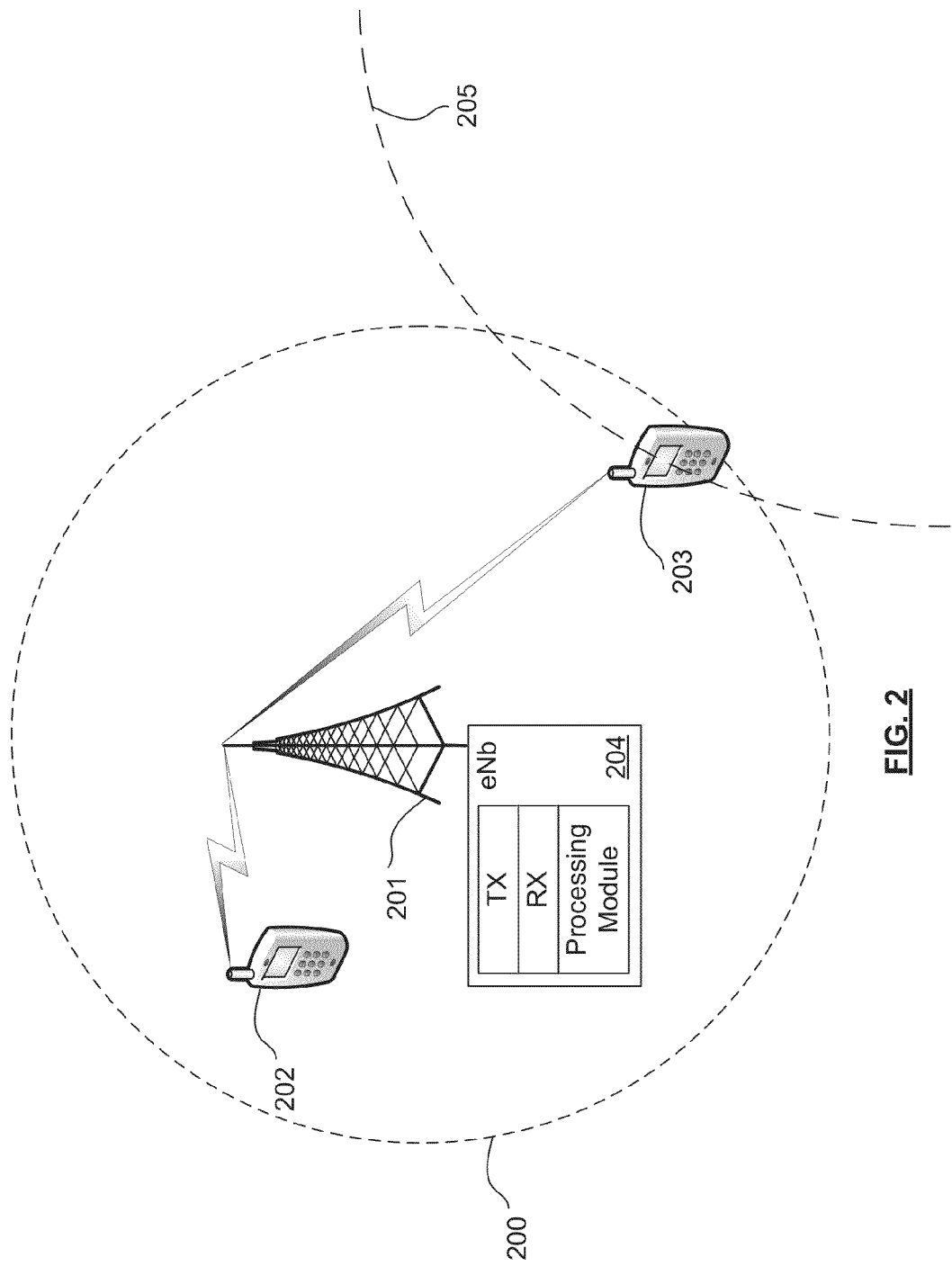
FIG. 2 illustrates a cell structure with node and user equipment (UE) in accordance with the present disclosure.

FIG. 2 illustrates a cell structure with node and user equipment (UE) in accordance with the present disclosure. A communications cell includes a geographic area for reception/transmission of wireless signals (radio frequencies (RF)) by one or more mobile communication devices (such as smartphones, tablets, etc.). As shown, cell 200 encapsulates a reception/transmission area extending radially from cell tower 201. Various mobile communication devices (UEs) 202 and 203 will be transmitting and receiving signals to/from cell tower 201 which includes a cell node (eNB) with base station 204 and connection to the cellular operator's network and eventual connection to the telephone network (not shown). The base station includes at least a transmitter (TX), receiver (RX) and processing module. As previously described, user equipment (UE) 203, such as a mobile phone operating within the cell, will often experience reduced transmission quality at the edge of a communications cell, especially in poor radio conditions (e.g., high interference, low transmission power, etc.). In addition to traditional interference elements (e.g., buildings, vehicles, weather, electrical sources, other RF transmission sources, etc.), the UE may receive interference from signals emanating from neighboring overlapping cell(s) 205. As the UE transmits on an uplink (UL) to cell node eNB 201, error correction techniques are used to improve a likelihood of success of decoding transmissions.

In certain communication protocols, standards, and/or recommended practices (e.g., Long Term Evolution (LTE), sometimes referred to as 4G LTE), transmission time interval (TTI) bundling may be employed. TTI bundling, generally, is a mechanism to transmit a packet over one TTI and retransmit it non-adaptively over a set of consecutive TTIs, without waiting for hybrid automatic repeat request (HARQ) feedback (e.g., from a receiver communication device). Bundling reduces time required by power limited user equipment (UE) to complete the transmission.

Figure 3:
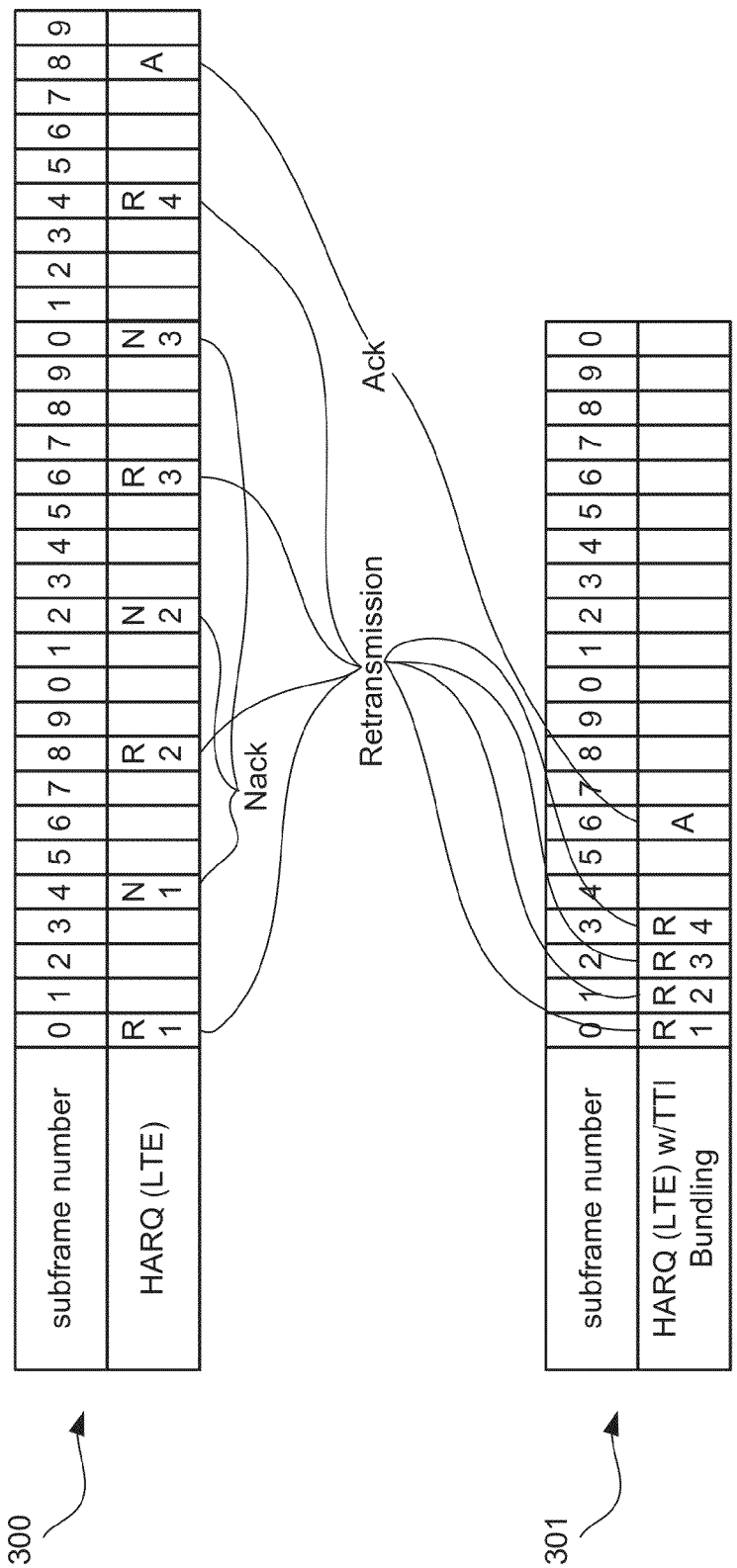
FIG. 3 illustrates an example of subframes showing HARQ bundled TTI retransmissions in accordance with the present disclosure.

FIG. 3 illustrates an example of subframes showing HARQ bundled TTI retransmissions in accordance with the present disclosure. Transmissions from/to communication devices, such as user equipment 202 and 203, are sent in frames which include a number of subframes (In this example, 10 subframes per frame). Frame structures are used so that a communications system can maintain synchronization and manage the different types of information that need to be carried between the base-station or eNodeB and the UEs.

As previously discussed, UEs will often experience reduced transmission quality at the edge of a communications cell. During reduced transmission quality scenarios, data that is transmitted will sometimes not be decoded properly and will therefore need to be retransmitted. A typical HARQ process 300, without TTI bundling, will retransmit a series of versions (redundancy versions R with a different set of encoded bits) of previously transmitted data (during one TTI, e.g., frame 1, subframe 0) until the transmitted data is properly decoded at the receiver (e.g., the eNB). As shown, when a data transmission (from UE) has errors and cannot be properly decoded by the receiver (at eNB), a first retransmission R1 occurs (frame 1, subframe 0). If the retransmission is unsuccessful (cannot be decoded) the cell node returns a negative acknowledgment (Nack) N1 (frame 1, subframe 4). This process is repeated (R2/N2/R3/R4) until the data is successfully decoded as indicated by a returned acknowledgement A (Ack) in frame 3, subframe 8. At this point, the retransmissions are halted.

Referring again to FIG. 3, a transmission scheme using HARQ (e.g., LTE) with TTI bundling error recovery 301 will bundle redundancy versions together and send them in consecutive subframes. As shown, assuming a transmission was unsuccessful (could not be decoded by the receiver), multiple retransmission versions (R1, R2, R3 and R4) are bundled (i.e., transmitted in frame 1 in consecutive subframes 0, 1, 3 and 4). The receiver will attempt to decode each version by combining with the previous versions received until it successfully decodes the transmission and an acknowledgement A is sent in a later subframe which is the HARQ feedback subframe corresponding to the last transmission in the bundle. As can be seen, the HARQ with bundling reduces time needed to successfully decode a data transmission (e.g., as shown—22 subframes earlier). Reduction in delays for transmission will improve system performance. In some embodiments, delays are not tolerable, such as voice over Internet protocol (VOIP) applications, which may require faster decoding. Of course, if R1-R4 does not result in a successful decode, the HARQ process will be continued.

In accordance with at least one communication protocol, standard, and/or recommended practice (e.g., LTE, or 4G LTE), certain issues may arise. For example, in accordance with LTE, or 4G LTE, Msg3 transmissions (i.e., the $3^{rd}$ message in a random access procedure which is sent over a physical uplink shared channel (PUSCH)) requesting bandwidth from the node are not TTI bundled, and this increases the random access latency of power limited users. Also, if an Msg3 transmission and a TTI bundled transmission occur over the same time frame, it can impair the performance of the TTI bundled transmission. The TTI bundled transmissions are impaired because TTI bundled transmissions as well as retransmissions are dropped in favor of Msg3.

As previously mentioned, in certain communication protocols, standards, and/or recommended practices (e.g., 3GPPrelease 8/9/10/11), TTI bundling is not supported for Msg3. Random access may be initiated to either request bandwidth or to get timing advance adjusted. For cases when the UL channel is too poor to transmit Msg3 (e.g., which is a minimum of 7 bytes) correctly in one attempt, this will result in multiple HARQ retransmissions of Msg3 where each retransmission will add to the total time required for the successful completion of the random access procedure (similar to FIG. 3, element 300).

Delay in random access success may result in delaying of a number of things including connection establishment or handover, transmission of time critical measurement reports, and bandwidth request/grant for data transmission if the scheduling request is not configured (e.g., even if it is configured, it may be ineffective for cell edge users because physical uplink control channel (PUCCH) transmissions without repetition may not necessarily be robust).

Hence, there can be considerable delay if Msg3 is not TTI bundled for a cell-edge user who would otherwise be benefiting from TTI bundling for normal uplink (UL) transmissions. For example, 4 retransmissions of Msg3 without TTI bundling will take, for example, 32 ms for frequency division duplex (FDD) and even more for some configurations of time-division duplexing (TDD). With TTI bundling, the same performance on UL can be achieved within a shorter time (e.g., 4 ms).

Figure 4:
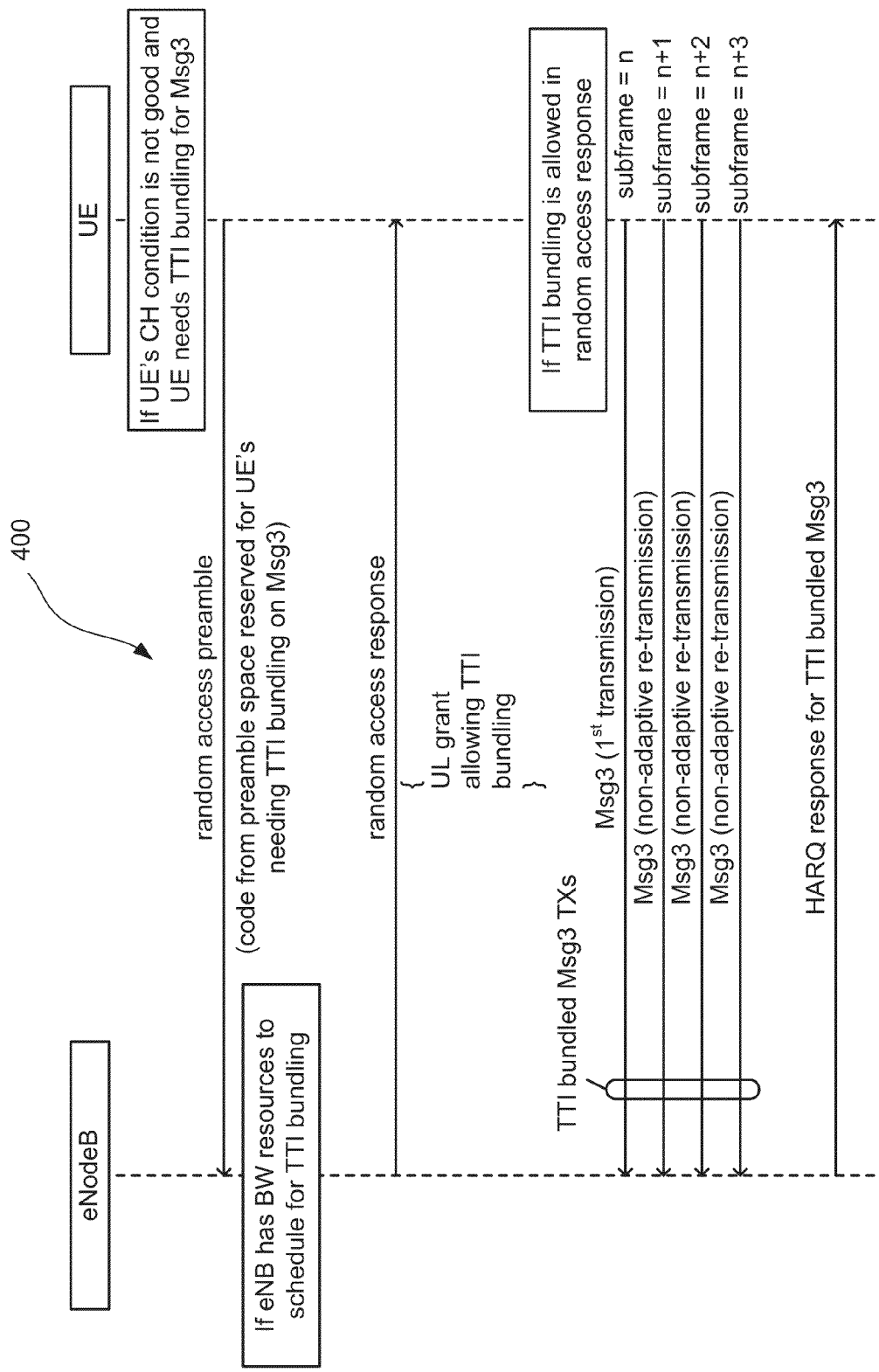
FIG. 4 illustrates a timeline embodiment showing Msg3 transmissions bundled in accordance with the present disclosure.

FIG. 4 illustrates a timeline embodiment showing Msg3 transmissions bundled in accordance with the present disclosure. As previously described, user equipment (UE), such as a mobile phone operating within a cell (e.g., FIG. 2, element 203), will often experience reduced transmission quality at the edge of a communications cell, especially in poor radio conditions. The following operation 400, as illustrated in FIG. 4, includes steps to improve the decoding time required at the eNB for UE UL transmitted data by approving bundling of Msg3 requests. The operation may be described as follows:

Step 1: If UE's channel condition (CH) is not good (e.g., high interference) and the UE desires TTI bundling for Msg3, it transmits to the node eNB a preamble ID (code) from a reserved preamble group that indicates TTI bundling is desired (or in a pre-configured sub frame meant for random access channel (RACH) transmission of UEs requiring TTI bundling).

Step 2: The eNB, upon receiving the transmitted preamble ID from a preamble group, decides to allocate a TTI-bundled transmission opportunity for Msg3 if eNB has bandwidth (BW) to schedule TTI bundling.

Step 3: An "A" (acknowledge) in the random access response bit (allow TTI bundling flag in random access response) indicates that the UE should proceed with TTI bundling of Msg3. It is noted that it is good to have the final control at the eNB side so that it can refuse TTI bundling request when the bandwidth resources are not sufficient or it can grant TTI bundling even if the UE does not express the need for it when it has free bandwidth resources.

Step 4: The UE, when it sees the bit set in the random access response message, understands that it can perform TTI bundling of a transmission of Msg3. The UE then non-adaptively transmits Msg3 back-to-back in, for example, 4 consecutive UL sub-frames without receiving HARQ Ack/Nack (acknowledgement/negative acknowledgement) in between.

Step 5: The eNB processes the 4 HARQ transmissions and sends back Ack/Nack.

Figure 5:
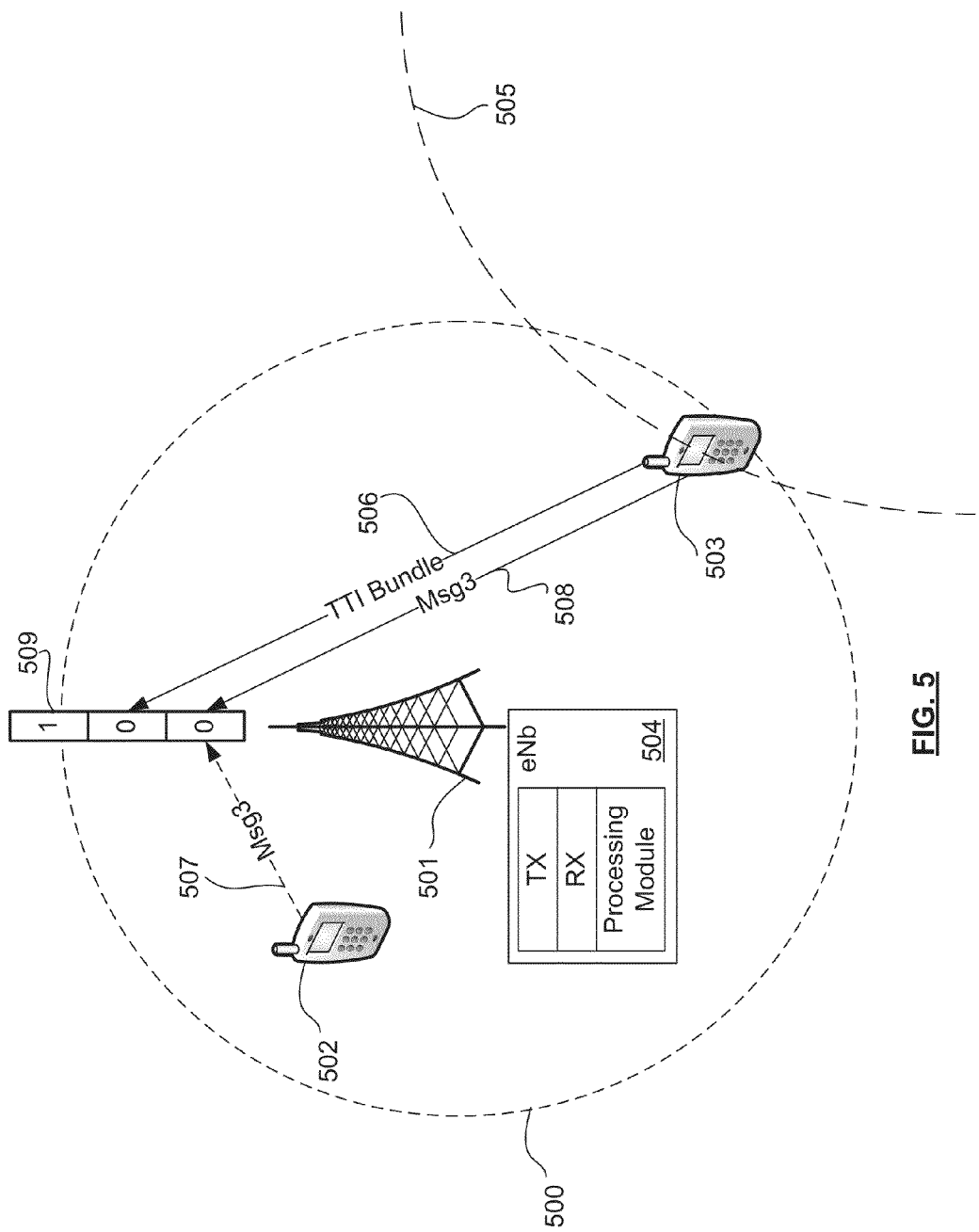
FIG. 5 illustrates the cell structure of FIG. 2 with collisions occurring between Msg3 (re)transmissions and TTI bundled (re)transmissions.

FIG. 5 illustrates the cell structure of FIG. 2 with collisions occurring between Msg3 (re)transmissions and TTI bundled (re)transmissions. As shown, cell 500 encapsulates a reception/transmission area extending radially from cell tower 501. Various mobile communication devices (UEs) 502 and 503 will be transmitting and receiving signals to/from cell tower 501 which includes a cell node (eNB) with base station 504 and connection to the cellular operator's network and eventual connection to the telephone network (not shown). The base station includes at least a transmitter (TX), receiver (RX) and processing module. The UE may receive interference from signals emanating from neighboring overlapping cell 505.

Referring to FIG. 5, UE 503 transmits, on an UL, TTI bundled (re)transmission 506. The TTI bundled transmission is transmitted using, for example, 4 consecutive subframes. However, collisions may occur in one or more of these subframes with independent random requests for bandwidth or timing updates (Msg3) from UE 503 or other UEs 502. For example, element 509 is one subframe in time with multiple requests for this slot (further described in FIG. 6). In this example, UE 503 has transmitted both a TTI bundled (re) transmission 506 as well as Msg3 508 which will collide at the overlapping time slot subframe 1 (509). As shown, other UEs, such as UE 502, can also transmit random requests (Msg3) 507 for this subframe.

In cases where an Msg3 (re)transmission and (re)transmission of a TTI bundle occur over the same subframe, the TTI bundled (re)transmission is dropped in favor of Msg3. Such collision can happen when the UE uses random access to request bandwidth or to adjust its timing advance while TTI bundled UL transmissions are going on independently.

This may lead to the following problems when an Msg3 (re)transmission collides (e.g., is scheduled in the same sub-frame) with a TTI bundled retransmission:

1. HARQ process identifier (HARQ PID) calculated for Msg3 is the same as the TTI bundled packet: This can happen as Msg3 and TTI bundled transmission may use the same HARQ ID pool. In this case, the HARQ buffer of the TTI bundled packet would be flushed. As a result, the lost packet can be only recovered by radio link control (RLC) or higher layer retransmissions.

2. HARQ process ID for Msg3 is different from the TTI bundled packet:

In this case, the HARQ buffer of the collided TTI bundled packet would not be flushed. However this packet still cannot be used for retransmission in the remaining subframes of the TTI bundle. This is because the redundancy version (CURRENT_IRV) of the TTI bundled packet is not increased in case of collision. Since the eNB may not be aware of the collision of Msg3 and TTI bundled packet, this would lead to a mismatch in the redundancy versions used for the subsequent retransmissions of the same TTI bundle and the redundancy versions expected by the eNB.

3. Even if Msg3 HARQ process ID is different from that of the colliding TTI bundled packet, it can be the same as the HARQ process ID of some other TTI bundled packet awaiting retransmission at a future subframe. If this happens, Msg3 transmission would flush the HARQ buffer of this future TTI bundled transmission and result in problem 1 above.

Figure 6:
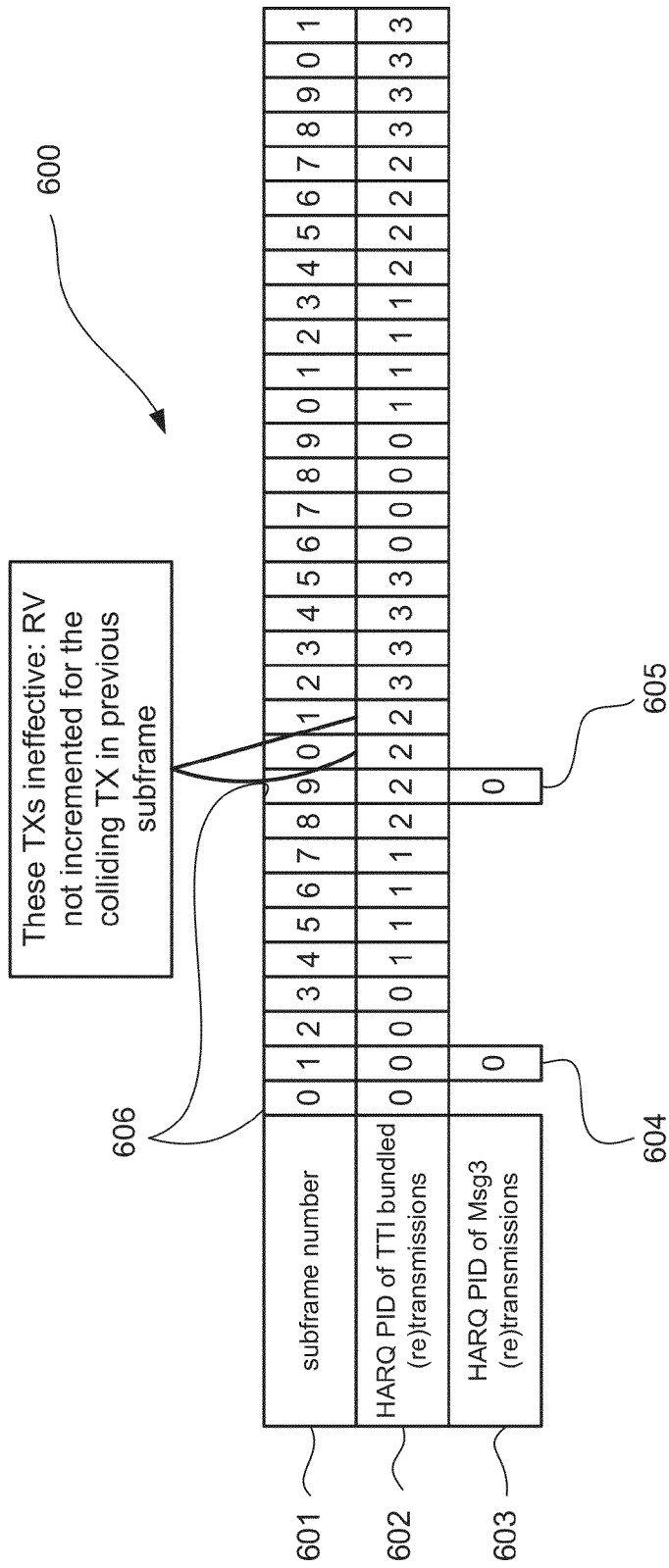
FIG. 6 illustrates example frames/subframes showing Msg3 (re)transmissions colliding with bundled (re)transmissions in accordance with the present disclosure.
Figure 7:
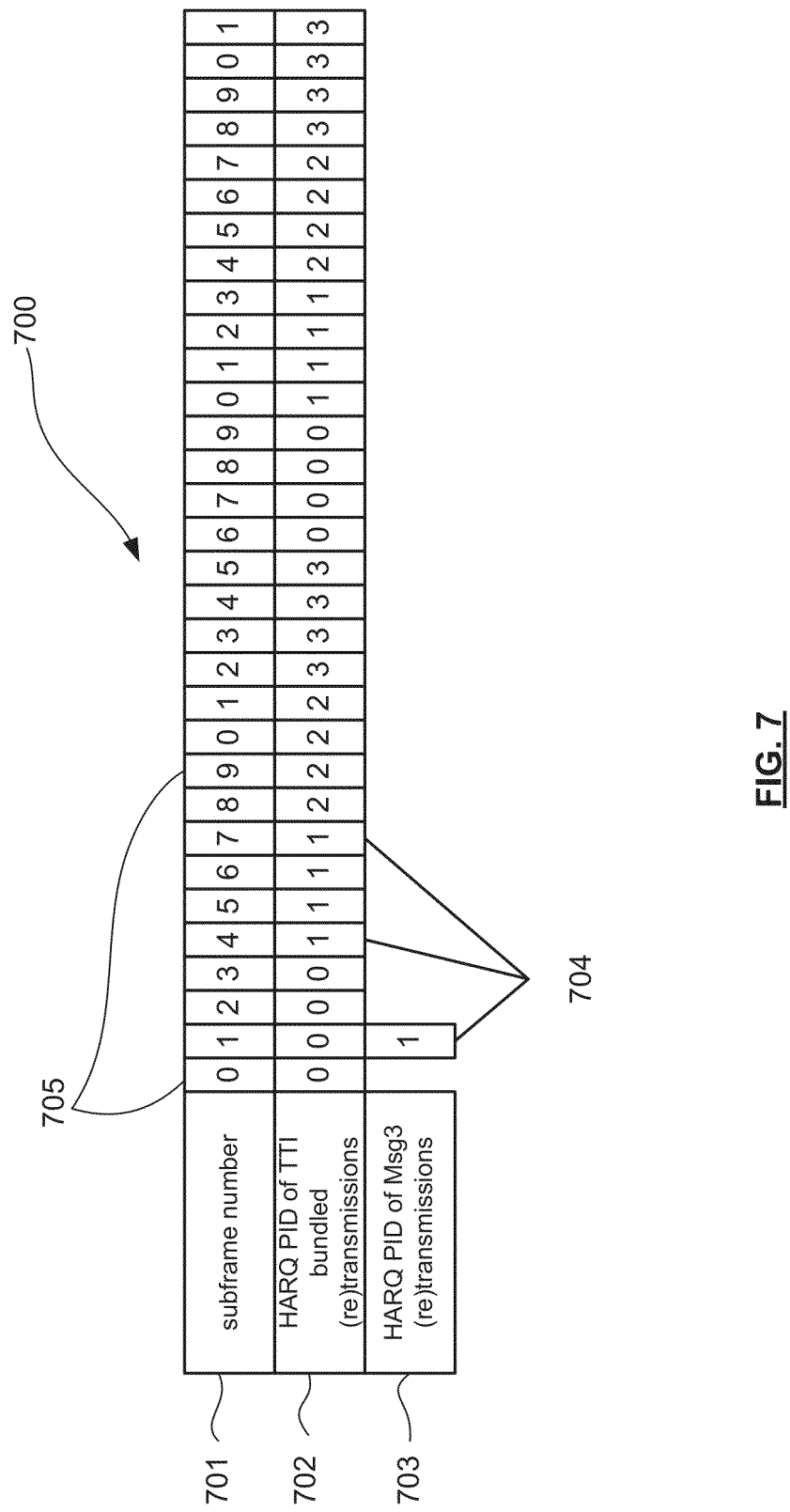
FIG. 7 illustrates another frame/subframe example in accordance with the present disclosure.

To have a better understanding of problems 1-3, FIGS. 6 and 7 collectively will illustrate problems 1-3 with a multi-frame/subframe analysis. In each figure, the first row will indicate the frame/subframes; the second row will indicate the TTI bundled (re)transmissions and the third row the unbundled Msg3 (re)transmissions.

FIG. 6 illustrates example frames/subframes showing Msg3 (re)transmissions colliding with bundled (re)transmissions in accordance with the present disclosure. As shown, FIG. 6 illustrates a subframe 601 example 600 of problems 1 and 2 where Msg3 (re)transmissions 603 are prioritized over TTI bundled (re)transmissions 602. As shown, a collision will occur between TTI bundle with HARQ process ID 0 in frame 1 (606), subframe 1 and Msg3 (re)transmission with HARQ processing ID 0 (frame 1 (606), subframe 1). As a result, the HARQ buffer for ID 0 would be flushed (problem 1). Also shown, a collision of TTI bundle with HARQ ID 2 (frame 1, subframe 9) and Msg3 TX with HARQ ID 0 (frame 1, subframe 9) would make subsequent TXs ineffective for TTI bundle 2 (problem 2).

FIG. 7 illustrates another frame/subframe example in accordance with the present disclosure. As shown, FIG. 7 illustrates a subframe example 700 of problem 3. Referring to frames/subframes 701, a collision will occur between TTI bundle 702 with HARQ ID 0 (frame 1 (705), subframe 1) and Msg3 (re)transmissions 703 with HARQ ID 1 (frame 1 (705), subframe 1). This collision will result in the flushing of HARQ buffer of a scheduled future transmission of TTI bundle HARQ ID 1.

The three problems described above lower the performance of TTI bundled UL transmissions. For example, in LTE frequency division duplex (FDD), there are 4 HARQ processes for TTI bundling. Msg3 (re)transmissions at, for example, 8 ms RTT can make the UE drop packets for 2 out of 4 TTI bundled HARQ processes. The dropped packets can only be recovered by radio link control (RLC) or higher layer retransmissions.

Figure 8:
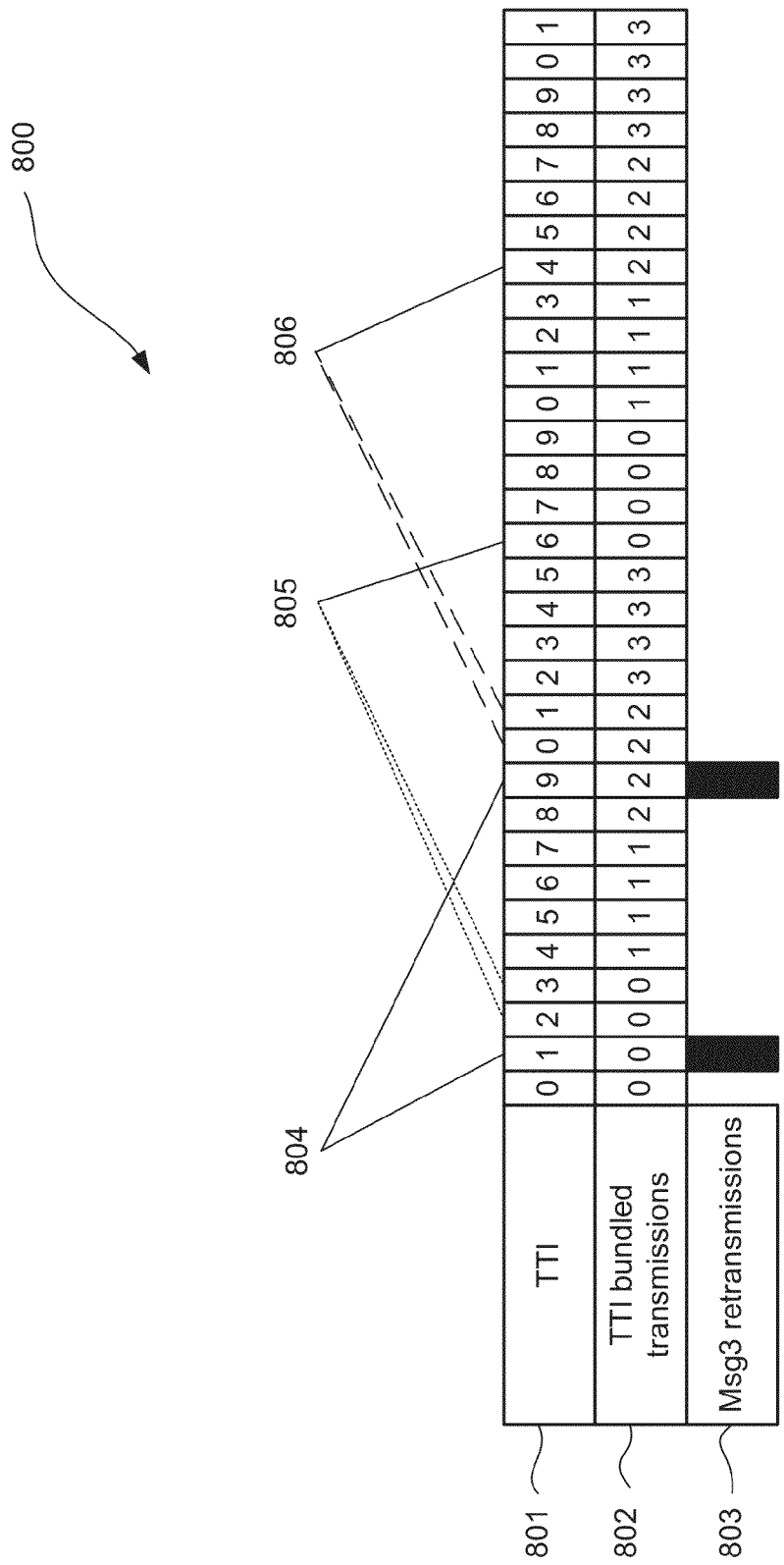
FIG. 8 illustrates an embodiment of disassociating non-TTI bundled Msg3 with TTI-bundled HARQ processes in accordance with the present disclosure.

FIG. 8 illustrates an embodiment of disassociating non-TTI bundled Msg3 with TTI-bundled HARQ processes in accordance with the present disclosure. Referring to subframe example 800 with subframes (TTI) 801, it shown that frame 1, subframes 1 and 9 (804) will incur collisions between TTI bundles 802 and Msg3 (re)transmissions 803 transmitted during these subframes. Prevention of a complete loss of TTI bundle data (flushing) occurs as follows:

1. For cases when Msg3 transmission is not TTI bundled, one embodiment assigns a separate HARQ process ID for Msg3 transmission. In this case, the HARQ buffer for the deferred TTI bundled packet would not be cleared as there is no possibility of a TTI bundled packet and Msg3 using the same HARQ process ID.

2. In a case where a TTI bundled packed is dropped due to transmission of Msg3; an alternate embodiment updates the redundancy version of the dropped packet to the next redundancy version anticipated by the eNB. For example, if R2 is dropped, the redundancy version is advanced to R3. If this is done, the dropped packets 804 can be retransmitted at the next eligible HARQ opportunity 805 and 806 (in the remaining sub frames of the same TTI bundle or as a retransmission of the entire bundle).

For the example given earlier, only 1 sub frame (e.g., frame 1, subframes 1 and 9) of the entire bundle for processes 0 and 2 is dropped and hence, the chances are that the first bundled transmission, even though with 1 sub frame dropped, can lead to correct decoding of the packets (as the redundancy version of the HARQ process IDs is updated even for the sub frame in which the transmission of the TTI-bundled packet is dropped). Modification of at least one communication protocol, standard, and/or recommended practice (e.g., LTE, or 4G LTE) may be performed to accommodate operation in accordance with certain of these aspects.

In the current standards (e.g., 3GPP, release 10), TTI bundling and UL SPS (semi-persistent scheduling) are not enabled together. Semi-persistent scheduling gives a UE the benefit of not having to decode PDCCH for any uplink allocations even while periodic uplink transmissions can continue as configured by semi-persistent scheduling. This can result in considerable battery savings in association with discontinuous reception (DRX) and will be especially beneficial for cell-edge users who would be using up a lot of power in transmission. Further, this also saves physical downlink control channel PDCCH overhead, which for cell-edge users, will be transmitted with the highest aggregation level or repetition. Hence, both TTI bundling and UL semi-persistent scheduling help cell-edge users and should be supported simultaneously.

Figure 9:
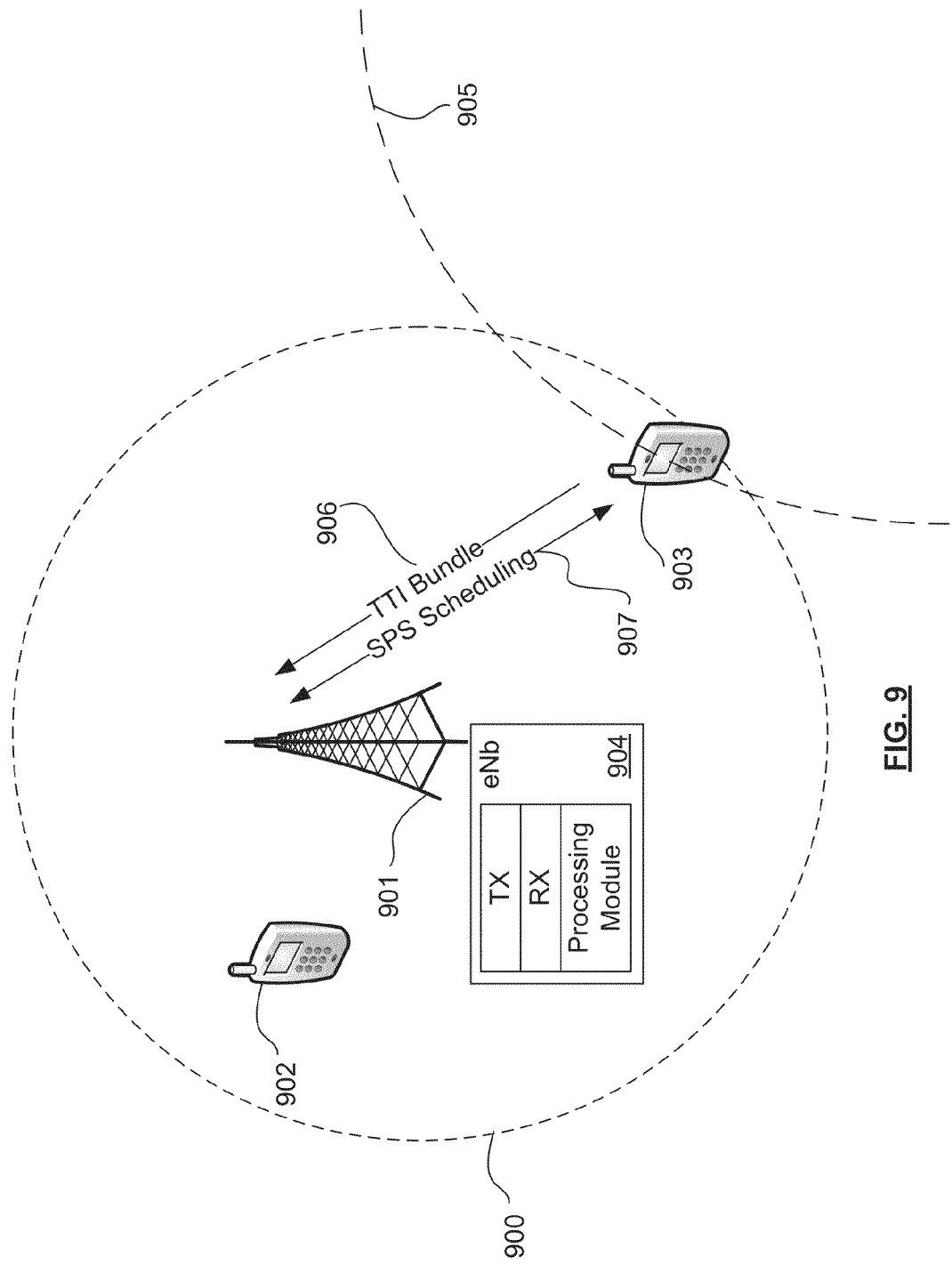
FIG. 9 illustrates the cell structure of FIG. 2 with bundling and semi-persistent scheduling in accordance with the present disclosure.

FIG. 9 illustrates the cell structure of FIG. 2 with bundling and semi-persistent scheduling in accordance with the present disclosure. As shown, cell 900 encapsulates a reception/transmission area extending radially from cell tower 901. Various mobile communication devices (UEs) 902 and 903 will be transmitting and receiving signals to/from cell tower 901 which includes a cell node (eNB) with base station 904 and connection to the cellular operator's network and eventual connection to the telephone network (not shown). The base station includes at least a transmitter (TX), receiver (RX) and processing module. The UE may receive interference from signals emanating from neighboring overlapping cell 905.

Referring to FIG. 9, UE 503 transmits, on an UL, TTI bundled (re)transmission 906. The TTI bundled transmission is transmitted using, for example, 4 consecutive subframes. In order not to have to decode PDCCH for any uplink allocations even while periodic uplink transmissions can continue, the UE is configured by semi-persistent scheduling 907.

3GPP release 10 (alternatively referred to as LTE release 10) does not support TTI bundling and UL SPS simultaneously for TDD. For TDD, UL SPS intervals must be a multiple of 10 ms. For TDD, there are six DL/UL frame configurations (0-6). Of these six configurations, those available for TTI bundling (i.e., at least 4 UL transmissions per frame) are TDD configurations 0, 1 and 6.

In one or more embodiments, a method is disclosed herein to include TTI-bundling and UL SPS to co-exist for TDD.

FIG. 10 illustrates a subframe embodiment showing transmissions with TTI bundling and semi-persistent scheduling (SPS) in accordance with the present disclosure. As shown, FIG. 10 illustrates UL SPS with TTI bundling for TDD/UL configuration 1. As shown, UL SPS and TTI bundling can be supported together in the following way:

TDD configuration 1: This configuration allows 2 TTI bundled HARQ processes. The HARQ processes repeat every 8 UL subframes. Any multiple of 10 milliseconds (ms) works as UL SPS periodicity. Since, for TDD, all SPS intervals are rounded down to multiples of 10, this means that all values of UL SPS intervals work. However, twoIntervalsConfig must be disabled. This configuration makes the interval between two consecutive UL SPS timings to alternate between I−1 and I+1 where I is the UL SPS interval. An interval of 40 ms will ensure one HARQ retransmission opportunity for the TTI bundled packet. An interval of 10 ms or 20 ms can also be used but this means that there cannot be any retransmission of the TTI bundle before the transmission of a new bundle.

FIG. 11 illustrates another subframe embodiment showing transmissions with TTI bundling and semi-persistent scheduling (SPS) in accordance with the present disclosure. As shown, FIG. 11 illustrates UL SPS with TTI bundling for TDD/UL Configuration 6. As shown, UL SPS and TTI bundling can be supported together in the following way:

TDD configuration 6: This configuration allows 3 TTI bundled HARQ processes. The HARQ processes repeat every 12 UL subframes. Any multiple of 40 ms works as UL SPS periodicity. This will ensure at least one HARQ retransmission opportunity for the TTI bundling packet. An interval of 20 ms, if used, will flush the buffer corresponding to a previous HARQ process transmission as there will be an overlap.

FIG. 12 illustrates yet another subframe embodiment showing transmissions with TTI bundling and semi-persistent scheduling (SPS) in accordance with the present disclosure. As shown, FIG. 12 illustrates UL SPS with TTI bundling for TDD/UL Configuration 6. As shown, UL SPS and TTI bundling can be supported together in the following way:

TDD configuration 0: This configuration allows 3 TTI bundled HARQ processes. The HARQ processes repeat every 14 UL subframes. Any multiple of 70 ms works as UL SPS periodicity. This value will ensure 2 retransmission opportunities for the previously transmitted TTI bundle. However, this value is not supported currently. Since, TDD configuration 0 has 6 UL subframes in a radio frame of 10 sub frames; this may not be optimal for voice-type traffic. A multiple of 30 ms can also be used as UL SPS periodicity. This value will ensure 1 retransmission opportunity of the previously transmitted TTI bundle. An interval of 20 ms, if used, will flush the buffer corresponding to a previous HARQ process transmission as there will be an overlap but can be used still. Similarly, an interval of 10 ms means no HARQ retransmission of any bundle is possible.

Modification, such as at least those described below, of at least one communication protocol, standard, and/or recommended practice (e.g., LTE, or 4G LTE) may be performed to accommodate operation in accordance with any one or more of the various aspects, embodiments, and/or their equivalents, of the technology described herein.

A communication protocol, standard, and/or recommended practice may be modified to provide a reserved group of preambles or a reserved set of random access preamble transmission opportunities which can be used to indicate the need of transmission of a TTI-bundled Msg3. Further, a mechanism to indicate that the Msg3 grant is for a TTI-bundled transmission may also be employed in the Random Access Response.

A communication protocol, standard, and/or recommended practice may be modified to provide clarification so that the UE transmits the same redundancy version for transmissions within a TTI bundle as the eNB expects even if any of the transmission are dropped due to collision with a Msg3 transmission. Also, it should be clarified that Msg3 will not replace the contents of any TTI-bundled HARQ processes.

A communication protocol, standard, and/or recommended practice may be modified to provide for removal of the restriction regarding co-existence of TTI bundling and UL SPS in the standard. Further, for TDD DL/UL configuration 0, UL SPS intervals which are multiples of, for example, 70 ms may need to be included or the interpretation of the existing intervals can be changed to multiples of 70 ms if TTI bundling is also enabled.

As may be understood, improvement of Msg3 performance in the case of cell edge users through TTI bundling may be provided in accordance with any one or more of the various aspects, embodiments, and/or their equivalents, thereby reducing the delay in attaching to the network, transmitting time-critical RRC messages and handover. Also, general UL performance improvement for cell edge-users may be effectuated by not allowing sudden drops in TTI-bundled transmissions because of collisions with Msg3. UL SPS and TTI bundling may be allowed to co-exist for TDD which improves the transmission of voice-traffic for cell-edge users along with saving scheduling overhead through SPs.

While the use of eNB and UE is employed for illustration in certain embodiments and/or diagrams herein, it is noted that such functionality may generally be applied to any communication system including 2 or more communication devices (e.g., such as considering the eNB as a first communication device, a UE as a second communication device, etc.).

Any one or more of the various aspects, embodiments, and/or their equivalents, of the present disclosure may be viewed as having at least the following components and/or addressing various aspects of at least the various problems described above.

It is also noted that the various operations and functions as described with respect to various methods herein may be performed within a wireless communication device, such as using a baseband processing module and/or a processing module implemented therein, and/or other components therein. For example, such a baseband processing module can generate such signals and frames as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing to generate signals for transmission using at least one of any number of radios and at least one of any number of antennae to another wireless communication device (e.g., which also may include at least one of any number of radios and at least one of any number of antennae) in accordance with various aspects of the technology described herein, and/or any other operations and functions as described herein, etc. or their respective equivalents. In some embodiments, such processing is performed cooperatively by a processing module in a first device, and a baseband processing module within a second device. In other embodiments, such processing is performed wholly by a baseband processing module or a processing module.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the technology described herein, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/ or processing unit executes, hard coded and/or operational instructions corresponding to at least some of the steps and/or functions illustrated in one or more of the Figures. Such a memory device or memory element can be included in an article of manufacture.

The present disclosure has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The present disclosure may have also been described, at least in part, in terms of one or more embodiments. An embodiment of the technology described herein is used herein to illustrate the technology described herein, an aspect thereof, a feature thereof, a concept thereof, and/or an example thereof. A physical embodiment of an apparatus, an article of manufacture, a machine, and/or of a process that embodies the technology described herein may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the technology described herein. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the technology described herein have been expressly described herein, other combinations of these features and functions are likewise possible. The technology described herein is not limited by the particular examples disclosed herein and expressly incorporates these other combinations.

What is claimed is:

1. A communication device comprising:
a processing module configured to:
receive a random access request from a remote communication device;
determine whether a bundled transmission opportunity is to be allocated to the remote communication device, the bundled transmission opportunity comprising a transmission time interval (TTI) bundle, including multiple hybrid automatic repeat requests (HARQ) for random access message 3 (Msg3);
when the bundled transmission opportunity is to be allocated, determine subframes to allocate;
generate a response message to the remote communication device including the bundled transmission opportunity and the determined subframes to allocate; and
for collisions between a non-TTI bundled Msg3 transmission and the TTI bundles, including multiple hybrid automatic repeat requests (HARQ) for random access message 3 (Msg3), the processing module is further configured to update a redundancy version of dropped packets to a next redundancy version anticipated by the communications node.

2. The communication device of claim 1, wherein the random access request comprises: at least on a preamble identifier (ID) from a preamble group to indicate transmission time interval (TTI) bundling or at least a pre-configured sub frame for random access channel (RACH).

3. The communication device of claim 1, wherein the communication device comprises a base station and the remote communication device comprises a user equipment (UE) communication device.

4. The communication device of claim 1, wherein, for time-division duplexing (TDD) transmissions, the processing module is further configured to support transmission the time interval (TTI) bundling and UL semi-persistent scheduling (SPS).

5. The communication device of claim 4, wherein, for time-division duplexing (TDD) configuration 1 transmissions, the processing module is further configured to support 2-transmission time interval (TTI) bundling with the UL semi-persistent scheduling (SPS) of a multiple of 10 millisecond periodicity.

6. The communication device of claim 4, wherein, for time-division duplexing (TDD) configuration 6 transmissions, the processing module is further configured to support 3-transmission time interval (TTI) bundling with the UL semi-persistent scheduling (SPS) of a multiple of 40 millisecond periodicity.

7. The communication device of claim 4, wherein, for time-division duplexing (TDD) configuration 0 transmissions, the processing module is further configured to support 3-transmission time interval (TTI) bundling with the UL semi-persistent scheduling (SPS) of a multiple of 70 millisecond periodicity.

8. The communication device of claim 1 further comprising, for collisions between a non-TTI bundled Msg3 transmission and the TTI bundle, including multiple hybrid automatic repeat requests (HARM) for random access message 3 (Msg3), the processing module is further configured to update a redundancy version of dropped packets to a next redundancy version anticipated by the communication device.

9. A method performed in a communications node, the method comprising:
receiving a request from a communications device, the request including allocation of a transmission time interval (TTI) bundled uplink (UL) transmission opportunity for random access message 3 (Msg3);
determining if resources are sufficient to support TTI bundling of Msg3;
if resources are sufficient, transmitting to the communications device an UL transmission grant for TTI bundling of Msg3 retransmissions;
receiving and processing Msg3 transmissions and the TTI-bundled msg3 retransmissions from the communications device; and
for collisions between a non-TTI bundled Msg3 transmission and the TTI bundling of Msg3 retransmissions, updating a redundancy version of dropped packets to a next redundancy version anticipated by the communications node.

10. The method of claim 9, wherein the request further comprises one of: at least a preamble identifier (ID) from a preamble group to indicate the transmission time interval (TTI) bundling or at least a pre-configured sub frame for random access channel (RACH) for communications devices requiring the TTI bundling.

11. The method of claim 9, wherein the TTI-bundled Msg3 retransmissions comprise multiple Msg3 hybrid automatic repeat request (HARM) transmissions in consecutive UL subframes.

12. The method of claim 9, wherein the communication node transmits at least one Ack/Nack (acknowledgement/negative acknowledgement) to the requesting communications device indicating successful decoding of the Msg3 at the communications node.

13. The method of claim 9 further comprising, for time-division duplexing (TDD) transmissions, supporting transmission of the TTI bundling of Msg3 retransmissions and UL semi-persistent scheduling (SPS) for time-division duplexing (TDD) configuration 0, 1 or 6 transmissions.

14. A method performed in a communications device, the method comprising:
requesting from a communications node allocation of a bundled UL transmission opportunity, the bundled UL transmission opportunity comprising transmission time interval (TTI) bundles, including multiple hybrid automatic repeat requests (HARQ) for random access message 3 (Msg3);
receiving from the communications node a bundled UL transmission grant;
transmitting to the communications node the bundled UL transmission; and
for collisions between non-TTI bundled Msg3 transmissions and the TTI bundles, including multiple hybrid automatic repeat requests (HARQ) for random access message 3 (Msg3), updating a redundancy version of dropped packets to a next redundancy version anticipated by the communications node.

15. The method of claim 14, wherein the step of dissociating comprises assigning a separate HARQ process ID for the non-TTI bundled Msg3 transmissions.

16. The method of claim 14, wherein the communications device comprises a processor module configured to: combine a plurality of hybrid automatic repeat request (HARQ) transmissions into the bundle and transmit the bundle as the bundled UL transmission to the communications node; and further configured to receive at least one acknowledgement/negative acknowledgement (Ack/Nack) indicating status of decoding of the bundled UL transmission by the communications node.

17. The method of claim 14 further comprising, for time-division duplexing (TDD) transmissions, supporting the TTI bundle, including multiple hybrid automatic repeat requests (HARD) for random access message 3 (Msg3), and UL semi-persistent scheduling (SPS) for time-division duplexing (TDD) configuration 0, 1 or 6 transmissions.

* * * * *